United States Patent [19]

Moody

[11] Patent Number: 5,406,171
[45] Date of Patent: Apr. 11, 1995

[54] VEHICLE CONTROL MODULE FOR COURTESY LIGHT TURN OFF WHEN DOOR LOCK IS SENSED NO MATTER THE STATE OF THE DELAY TURN OFF CIRCUIT

[75] Inventor: Michael W. Moody, San Antonio, Tex.

[73] Assignee: Motorola, Inc., Schaumburg, Ill.

[21] Appl. No.: 868,397

[22] Filed: Apr. 14, 1992

[51] Int. Cl.$^6$ ............................................. H05B 37/00
[52] U.S. Cl. ........................................ 315/77; 315/84; 307/10.8; 362/80
[58] Field of Search .................... 315/84, 77; 307/10.8; 362/80

[56] References Cited

FOREIGN PATENT DOCUMENTS 0119446 6/1986 Japan ...................................... 315/84

OTHER PUBLICATIONS

"Toyota Van 1987 Repair Manual" Wiring diagram pp. 2 and 3.
"Accessories for the Car", Radio Elektron vol. 28, No. 7 (Apr. 9, 1980) pp. 43, 45, 47, 49.

Primary Examiner—Robert J. Pascal
Assistant Examiner—Michael Shingleton
Attorney, Agent, or Firm—Nicholas C. Hopman

[57] ABSTRACT

A vehicle control apparatus is disclosed including a vehicle control module (101) having an input (109) and an output (153). When the input (109) receives a lock door command the output (153) provides a lights on-off control signal (155) to be used to control a light (159). Additionally, a method for providing a lights on-off control signal (155) to be used to control a light (159) is disclosed.

10 Claims, 2 Drawing Sheets

VEHICLE CONTROL MODULE FOR COURTESY LIGHT TURN OFF WHEN DOOR LOCK IS SENSED NO MATTER THE STATE OF THE DELAY TURN OFF CIRCUIT

FIELD OF THE INVENTION

This invention is generally directed to the field of vehicle control and may be used to control the illumination of vehicle lights during entry and exit from a vehicle.

BACKGROUND OF THE INVENTION

Presently, vehicles typically have interior or courtesy lights that turn on when a door is opened. These may include floor mounted lights and an overhead dome light. Particularly useful in dark conditions this feature is meant as a convenience for the person opening the door and entering the vehicle. When the door is closed the vehicle courtesy lights will stay on to allow the person to orient themselves in the automobile. Then, a predetermined time later, or if the ignition keyswitch is activated, the vehicle courtesy lights will turn off. Similarly, when the person opens the door and exits the vehicle the vehicle courtesy lights will turn on. After the door is closed the vehicle courtesy lights will stay illuminated for a predetermined time before shutting off. This presents several undesirable consequences. For instance, if a person exits their automobile in a dark or isolated area they don't want to have the vehicle courtesy lights stay on after they leave the vehicle because the lights will draw attention to the person and their vehicle. This is undesirable because personal property and safety could be at risk. Additionally, when the vehicle courtesy lights stay on after exiting the vehicle, the person may wonder if the door is still open raising concern that the battery will be drained when they return to the vehicle.

What is needed is an improved vehicle control system for controlling the vehicle lights.

SUMMARY OF THE INVENTION

A vehicle control apparatus is disclosed including a vehicle control module having an input and an output. The input receives a lock door command and the output, responsive to receiving the lock door command provides a lights on-off control signal to be used to turn off a light. Additionally, a method for providing a lights on-off control signal to be used to control a light is disclosed.

BRIEF DESCRIPTION OF THE DRAWINGS

FIG. I is a schematic block diagram detailing a vehicle control apparatus, in accordance with the invention.

DETAILED DESCRIPTION OF A PREFERRED EMBODIMENT

In a preferred embodiment an improved vehicle control apparatus and method are disclosed. In this embodiment a vehicle courtesy lights control module is described. The system includes provision for a remote keyless entry system, further referred to herein as an RKE system.

Figure 1:
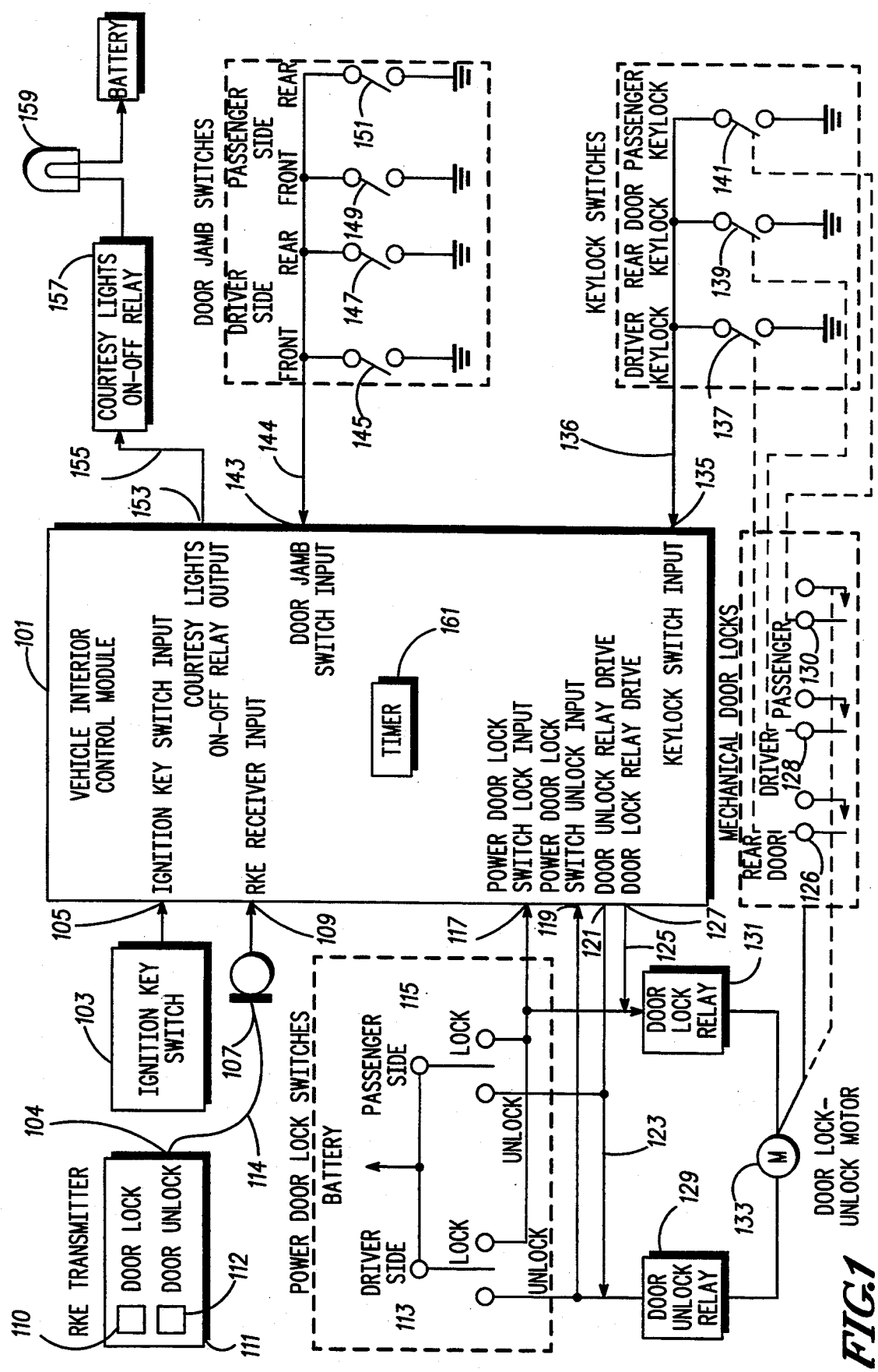

In FIG. 1 there is a schematic block diagram of a vehicle interior control module 101, in accordance with the invention. The control module 101 is illustrated having various inputs and an output surrounded by system components. Starting on the left of the schematic we find an ignition key switch 103 for providing an indication of the state of the ignition switch to an input 105 labeled ignition key input. Next, we find an RKE transmitter 111 having at least two switches; door lock 110 and door unlock 112. The RKE transmitter 111 in this case operates as an infrared device. An element 104 of the RKE transmitter 111 is an optical output port. This RKE transmitter 111 is used to transmit various commands including door lock and door unlock via a light wave 114 to an RKE receiver lens 107 that drives the control module 101 at an input 109. Of course, it would be obvious to one of ordinary skill in the art to substitute a radio frequency transceiver or other equivalent technology for this function.

Next, we find power door lock switches including a driver side switch 113 and a passenger side switch 115. These switches 113 and 115 have two operating positions. Both are shown in an unlock state in FIG. 1. They also have an opposing lock state. These switches 113 and 115 provide outputs to the control module 101 connected correspondingly to a power door locks switch input 117 and a power door lock switch unlock input 119. Additionally, these switches 113 and 115 are connected correspondingly to a door unlock relay 129 and a door lock relay 131. The door unlock relay 129 is additionally driven by a door unlock relay drive output 121 from the control module 101. Additionally, the door lock relay 131 is driven by a door lock relay drive output 127 from the module 101. Then, the door unlock relay 129 and the door lock relay 121 drive a door lock-unlock motor 133. This door lock-unlock motor 133 provides an electrical assist to the mechanical door locks shown for a rear door as element 126 with a driver door as element 128 and for a passenger door as element 130.

Next, a group of keylock switches are provided including; a rear door keylock switch 137, a driver keylock switch 139, and a passenger keylock switch 141. These keylock switches 137, 139, and 141 provide a keylock switch lock-unlock signal 136 to the control module's 101 keylock switch input 135.

Next, a group of door jamb switches are provided. These include; a driver side front 145, driver side rear 147, passenger side front 149, and a passenger side rear 151 door jamb switch. These switches 145, 147, 149, and 151 provide a door jamb open-closed signal 144 to the control module's 101 door jamb switch input 143. The door input switches in FIG. 1 are shown in positions which indicate that all the vehicle doors are closed.

Next, a group of courtesy lights illustrated by element 159 are provided. These courtesy 159 are driven by a courtesy lights on-off relay 157 that is provided a lights on-off signal 155 from a courtesy lights on-off output 153 from the control module 101.

Finally, a timer 161 is provided integral to the control module 101. The control module 101 includes a microcontroller. In the preferred embodiment a Motorola MC6805C8 is used. Of course, it would be obvious to one of ordinary skill in the art to substitute another microcontroller or hardwired logic to perform the same function.

This completes the description of the control module 101 and its attendant system level components.

Figure 2:
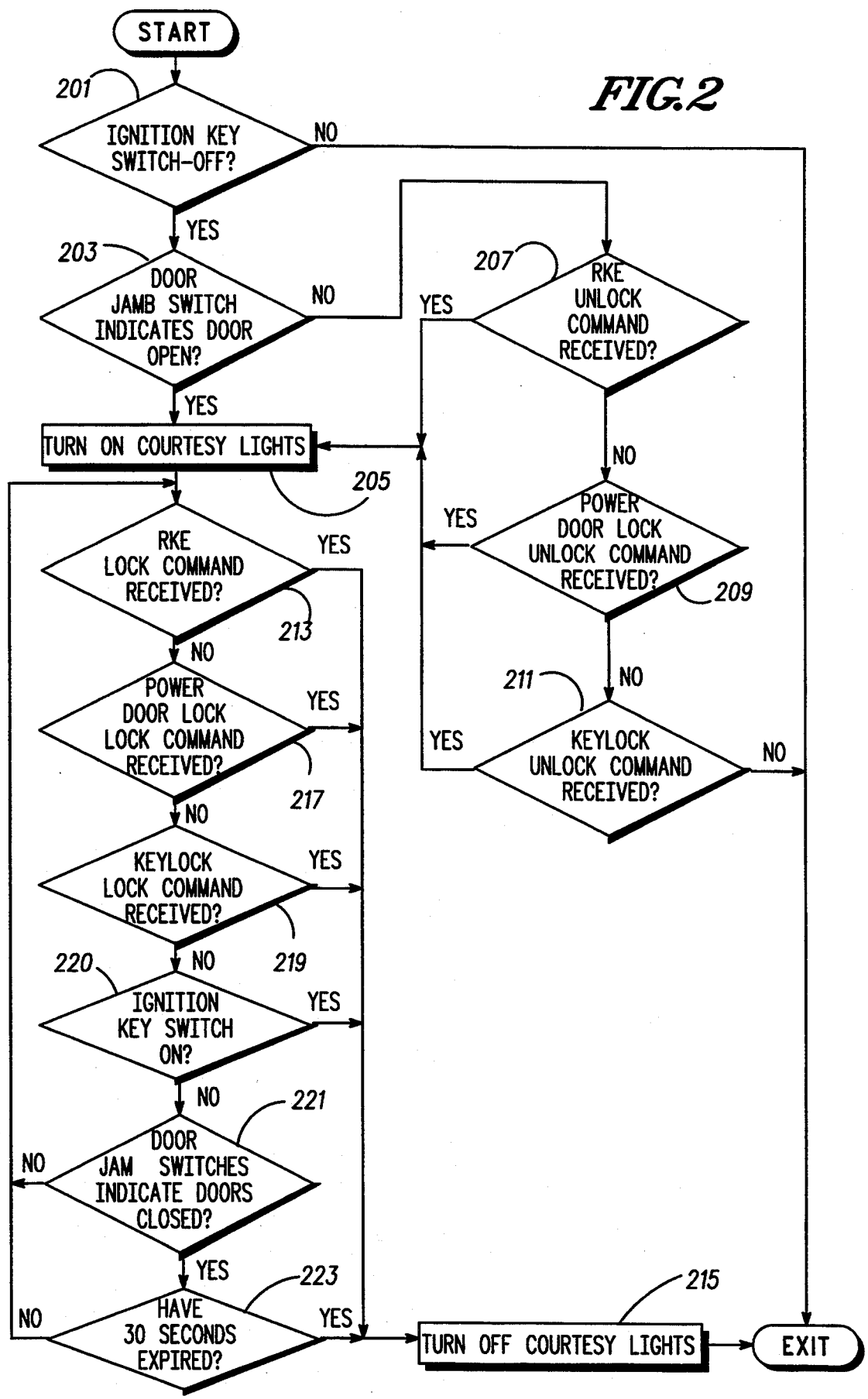
FIG. 2 is a method flow chart describing a strategy of software steps programmed into a microcontroller present in the apparatus illustrated in FIG. 1.

We next turn our attention to FIG. 2 that illustrates a flow chart describing a strategy of software steps embedded in the microcontroller located in the control module 101. The first step 201 is to determine if the ignition key switch is off. To do this, the control module 101 interrogates the ignition key switch input 105. If the ignition key switch isn't off the strategy is exited. If the ignition key switch is off, then a next step 203 is executed. The step 203, determines if a door jamb switch indicates that a door is open. To do this, the control module 101 interrogates the door jamb switch input 143 and looks for a door jamb open-closed signal 144 open state provided by one or more of the door jamb switches 144, 145, 149, 151. If the door jamb open-closed signal indicates that a door is open the courtesy lights 159 are turned on in step 205. The control module 101 does this by generating an on state of the lights on-off control signal 155. This lights on-off control signal 155 then drives the courtesy lights on-off relay 157 that then drives the courtesy lights 159 on. If the test in step 203 results in indication that no door jamb switch 144, 145, 149, or 151 indicates a door is open then a further test in step 207 is applied.

In step 207, the control module 101 determines if an RKE unlock command has been received. The control module 101 interrogates the RKE receiver input 109 to look for this command. If the RKE unlock command has been received then the courtesy lights 159 are turned on in step 205 as detailed earlier. If the control module 101 determines that RKE unlock command has not been received then a further test in step 209 is applied. In the step 209 the control module 101 determines if a power door lock, unlock command has been received. To do this the control module 101 interrogates the power door lock switch unlock input 119. If the control module 101 determines that the power door lock, unlock command has been received, the courtesy lights 159 are turned on in step 205 as detailed earlier. If no power door lock, unlock command has been received as determined in step 209 a further test step 211 is applied. In step 211 the control module 101 determines if a keylock, unlock command has been received. The module interrogates the keylock switch input 135 looking for the keylock switch lock-unlock signal 136 provided by the keylock switches 137, 139, 141. If a keylock, unlock command has been received then the courtesy lights are turned on in step 205 as detailed earlier. If a keylock, unlock command has not been received as determined by step 211 the strategy is exited.

Once the courtesy lights 159 are on the driver, and or the passenger, will presumably exit the vehicle. The control module 101 then tests for a condition to turn the courtesy lights off. In a first test 213 the control module 101 determines if an RKE lock command has been received. To determine if an RKE lock command has been received the module 101 interrogates the RKE receiver input 109 looking for the RKE lock command. If an RKE lock command has been received, the courtesy lights are turned off in step 215. The control module 101 does this by generating an off state of the lights on-off control signal 155. This lights on-off control signal 155 then drives the courtesy lights on-off relay 157 that then drives the courtesy lights 159 off. If the module 101 does not determine that the RKE lock command has been received, a next test step 217 is executed.

In the next step 217, the control module 101 determines if a power door lock, lock command has been received. To determine if a power door lock has been received the module 101 interrogates the power door lock switch lock input 117. If the control module 101 determines that a power door lock, lock command has been received then it executes step 215 turning off the courtesy lights in step 215 as detailed earlier. If the control module 101 has not determined that a power door lock, lock command has been received in step 217, a test step 219 is applied. In step 219 the control module 101 determines if a keylock, lock command has been received. To determine if a keylock, lock command has been received the module interrogates the keylock switch input 135 and looks for a keylock switch lock-unlock signal 136 activated by one of the keylock switches 137, 139, 141. If the control module 101 determines that a keylock, lock command has been received in step 219, the courtesy lights are turned off in step 215 as detailed earlier. If the control module 101 does not determine that a keylock, lock command has been received in step 219 a further test step 220 is applied.

In step 220 the control module 101 determines if the ignition keyswitch has been turned on. If the control module 101 determines that the ignition keyswitch has been turned on, then the courtesy lights are turned off in step 215 as detailed earlier. If the control module 101 does not determine that the keyswitch has been turned on in step 220 a further test step 221 is applied.

In step 221 the control module 101 determines if the door jamb switches indicate that the doors are closed. To do this, the control module 101 interrogates the door jamb switch input 143 and looks for a door jamb open-closed signal 144 closed state provided by the door jamb switches 144, 145, 149, 151. If the door jamb open-closed signal indicates that all doors are closed a next step 223 is executed. If the door jamb open-closed signal indicates that a door is open the step 213 is repeated.

In step 223 the control module 101 determines if a predetermined time, in this case 30 seconds, has expired since the door jamb open-closed signal 144 indicated that all door jamb switches were closed in step 221. If 30 seconds have not expired since the door jamb open-closed signal 144 indicated that all door jamb switches were closed in step 221 then step 213 is repeated. If 30 seconds has expired since the door jamb open-closed signal 144 indicated that all door jamb switches were closed in step 221 then the courtesy lights 159 are turned off as detailed in step 215 earlier.

The turning off of the courtesy lights 159 by steps 213, 217, or 219 affords the driver or passenger with the benefit of the system by turning off the courtesy lights in response to a door lock command.

What is claimed is:

1. A vehicle control apparatus comprising: a vehicle control module having an input means and an output means wherein the vehicle control module turns on a courtesy light, via the output, in response to receiving an unlock door command, then maintains the courtesy light on for a predetermined time after the receipt of the unlock door command, and turns off the courtesy light, via the output means, before the predetermined time expires in response to receiving a lock door command at the input means.

2. An apparatus in accordance with claim 1 wherein said vehicle control module further comprises a door jamb switch input means for receiving a door jamb open-closed signal activated by a door jamb switch, said door jamb open-closed signal has a door jamb open state when a door jamb switch indicates a vehicle door is open, and a door jamb closed state when the door jamb switch indicates the vehicle door is closed, wherein said vehicle control module turns on the courtesy light, via the output means, in response to receiving the open state of the door jamb open-closed signal at the door jamb switch input, then maintains the courtesy light on for a predetermined time after the receipt of the open state of the door jamb open-closed signal at the door jamb switch input means, and turns off the courtesy light, via the output means, before the predetermined time expires in response to receiving the lock door command at the input means.

3. An apparatus in accordance with claim 1 wherein said vehicle control module further comprises a keylock switch input means for receiving a keylock switch lock-unlock signal activated by a keyswitch, said keylock switch lock-unlock signal has an unlock state when the keyswitch is unlocked, and wherein the keylock switch lock-unlock signal has a lock state when the keyswitch is locked, wherein said vehicle control module turns on the courtesy light, via the output means, in response to receiving the unlock state of the keylock switch lock-unlock signal at the keylock switch input means, then maintains the courtesy light on for a predetermined time after the receipt of the unlock state of the keylock switch lock-unlock signal at the keylock switch input means, and turns off the courtesy light, via the output means, before the predetermined time expires in response to receiving the lock state of the keylock switch lock-unlock signal at the keylock switch input means.

4. An apparatus in accordance with claim 1 wherein said vehicle control module further comprises a power door lock switch input means for receiving a power door lock switch lock signal activated by a power door lock switch, said power door lock switch lock signal has a lock state when the power door lock switch is locked and an unlock state when the power door lock switch is unlocked, wherein said vehicle control module turns on the courtesy light, via the output means, in response to receiving the unlock state of the power door lock switch at the power door lock switch input means, then maintains the courtesy light on for a predetermined time after the receipt of the unlock state of the power door lock switch, and turns off the courtesy light, via the output means, before the predetermined time expires in response to receiving a lock state of the of the power door lock switch at the power door lock switch input means.

5. An apparatus in accordance with claim 2 wherein said vehicle control module further comprises a timer having a predetermined time-out, and wherein said timer is coupled to said door jamb switch input means for receiving the door jamb open-closed signal and is activated in response to a transition from the door jamb open state to the door jamb closed state.

6. An apparatus in accordance with claim 5 wherein said timer after the predetermined time-out provides a lights on-off control signal to be used to turn off the light.

7. An apparatus in accordance with claim 1 wherein said vehicle control module further comprises an RKE receiver input means for receiving an RKE door lock-unlock signal having a lock state and an unlock state wherein said vehicle control module turns on the courtesy light, via the output means, in response to receiving the unlock state of the RKE door lock-unlock signal at the RKE receiver input means, then maintains the courtesy light on for a predetermined time after the receipt of the unlock state of the RKE door lock-unlock signal, and turns off the courtesy light, via the output means, before the predetermined time expires in response to receiving the lock state of the RKE door lock-unlock signal at the RKE receiver input means.

8. A vehicle courtesy lights control system comprising:
a vehicle courtesy lights control module having a door jamb switch input means for receiving a door jamb open-closed signal, a keylock switch input means for receiving a keylock switch lock-unlock signal, a power door lock switch lock input means for receiving a power door lock switch lock signal, an RKE receiver input means for receiving an RKE door lock-unlock signal, and a courtesy lights on-off output, wherein the vehicle courtesy lights control module turns on a courtesy light, via the courtesy lights on-off output means, in response to receiving an unlock state from the door jamb open-closed signal, power door lock switch lock signal, and the RKE door lock-unlock signal, and then maintains the courtesy light on for a predetermined time after the receipt of said unlock state, and turns off the courtesy light, via the courtesy lights on-off output, before the predetermined time expires in response to receiving a lock state from at least one of the door jamb open-closed signal, power door lock switch lock signal, and the RKE door lock-unlock signal.

9. A vehicle control method including the steps of:
turning on vehicle courtesy lights in response to receipt of a unlock door command;
maintaining the courtesy lights on for a predetermined time after the receipt of the unlock door command; and
turning off the vehicle courtesy lights before the predetermined time expires in response to receiving a lock door command.

10. A vehicle courtesy lights control method including the steps of:
turning on the vehicle courtesy lights when a door jamb switch indicates a door has been opened;
turning on the vehicle courtesy lights when a RKE unlock command has been received;
turning on the vehicle courtesy lights when a keylock has transitioned to unlock;
turning on the vehicle courtesy lights when a power door lock switch has transitioned to unlock;
maintaining the courtesy lights on for a predetermined time if the courtesy lights are turned on by one of the previous steps; then
turning off the vehicle courtesy lights before the predetermined time expires when a RKE lock command has been received;
turning off the vehicle courtesy lights before the predetermined time expires when a power door lock switch has transitioned into lock;
turning off the vehicle courtesy lights before the predetermined time expires when a keylock switch has transitioned into lock; and
turning off the vehicle courtesy lights before the predetermined time expires when a predetermined time has expired from when the door jamb switches indicates doors closed.

* * * * *